March 30, 1926.
L. FLEISCHMANN
1,578,971
SPEED CONTROL SYSTEM
Filed August 11, 1924
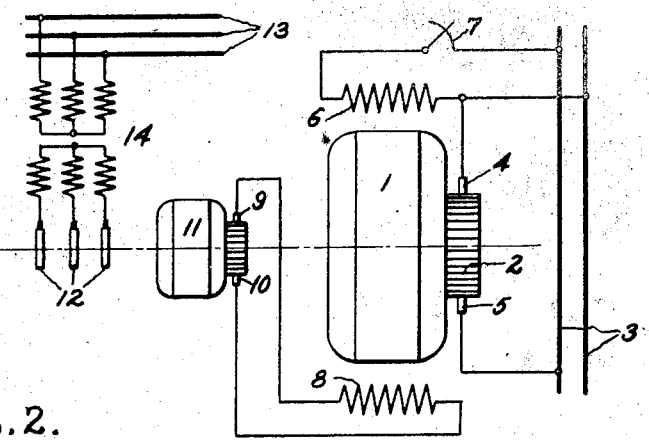
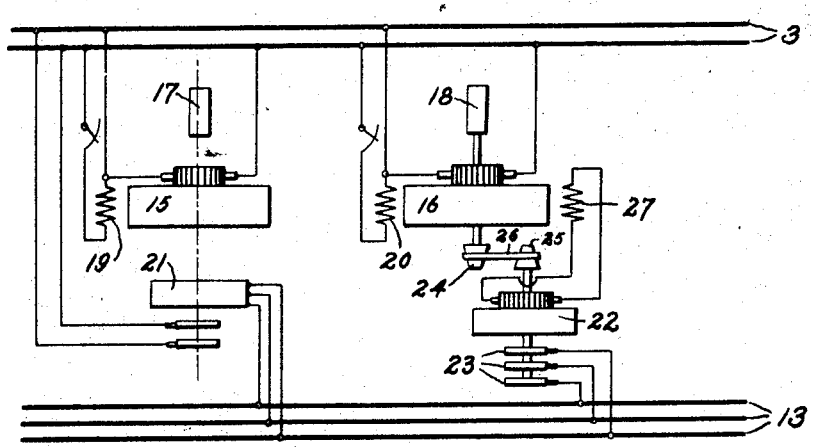
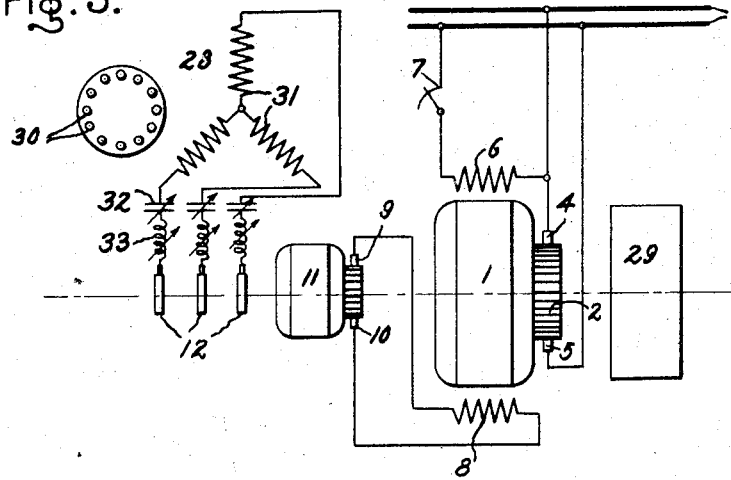
Inventor:
Lionel Fleischmann
by Alexander S. Lentz
His Attorney.

Patented Mar. 30, 1926.

1,578,971

UNITED STATES PATENT OFFICE.

LIONEL FLEISCHMANN, OF BERLIN, GERMANY, ASSIGNOR TO GENERAL ELECTRIC COMPANY, A CORPORATION OF NEW YORK.

SPEED-CONTROL SYSTEM.

Application filed August 11, 1924. Serial No. 731,272.

*To all whom it may concern:*

Be it known that I, LIONEL FLEISCHMANN, a citizen of the United States, residing at Berlin, Germany, have invented certain new and useful Improvements in Speed-Control Systems, of which the following is a specification.

My invention relates to systems for controlling the speed of electric motors, and has for its object the provision of an improved speed control system wherein a rotary converter exciter driven at a speed proportional to that of the motor is utilized to regulate the motor excitation in a manner to prevent objectionable variations in the motor speed.

It is well known that a rotating field is established when the armature winding slip rings of a rotary converter are connected to a source of polyphase alternating currents and that the speed at which this field rotates in space depends upon the number of poles, the frequency of the current and the speed at which the converter is driven. If the armature winding is stationary, the field moves in space at synchronous speed and the voltage available at the commutator brushes is of the same frequency as that impressed on the slip rings. When the armature winding is rotated at synchronous speed in a direction opposite to that of the field rotation, the field is stationary in space and the voltage available at the commutator brushes is unidirectional. The value of this unidirectional voltage is of course dependent upon the angular relation existing between the armature field and its commutating axis. Thus when the brushes are in alinement with the armature field, the unidirectional voltage is zero and when the brushes are in quadrature with the armature field, the maximum value of unidirectional voltage is available at the brushes. In accordance with my invention, this change in unidirectional voltage with change in the angular relation between the field and commutating axis of the rotary converter is utilized for controlling the motor excitation to maintain the motor speed substantially constant.

My invention will be better understood on reference to the following description when considered in connection with the accompanying drawing and its scope will be pointed out in the appended claims.

Referring to the drawing, Fig. 1 shows my invention as applied to a direct current motor; Fig. 2 shows a plurality of motors arranged to have their speed controlled in accordance with my invention; and Fig. 3 differs from Fig. 1 in that means are provided for varying the frequency of the current supplied to the slip rings of the rotary converter.

Fig. 1 shows a direct current motor comprising an armature winding 1 which is connected to a commutator 2 and is arranged to be supplied with current from the line 3 through commutator brushes 4 and 5. The shunt field winding 6 of the motor is connected to the line 3 through an adjustable field rheostat 7. A regulating shunt field winding 8 is arranged to vary the motor excitation in response to changes in the motor speed. The regulating winding 8 is connected to the commutator brushes 9 and 10 of a rotary converter 11 which is driven at a speed proportional to that of the motor and may be mounted on the motor shaft when the motor is to be operated at the synchronous speed of the converter. The alternating current slip rings 12 of the converter 11 are connected to the polyphase line 13 through a transformer 14. It will be readily understood that, with this arrangement, the excitation of the motor is dependent upon the resultant flux produced by the shunt field windings 6 and 8.

If the current supplied to the field winding 6 is adjusted to accelerate the motor to a speed equal to the synchronous speed of the converter 11 and the brushes 9 and 10 are moved into alinement with the converter field, no current will be supplied to the field winding 8 and the operation of the motor is unaffected by the connection between the converter and the winding 8. This condition will continue so long as the motor operates at the synchronous speed of the converter. When the motor speed changes, however, current will be supplied to the winding 8 from the converter 11 and the excitation of the motor will be changed. If the speed of the motor decreases, the converter field moves in one direction out of alinement with the converter commutating axis and the current supplied from the converter to the winding 8 produces a flux which tends to reduce the motor excitation and increases its speed. If the motor speed increases, the converter field moves in the opposite direction out of alinement with the converter commutating axis and the current supplied from the converter to the winding 8 produces a flux which tends to increase the motor excitation and reduce its speed. Any slight variation in the motor speed thus immediately brings into operation a force which tends to restore the motor speed to its normal value and this speed in maintained regardless of variations in the temperature of the motor field coils and variations in the voltage of the direct current source from which current is supplied to the motor.

Fig. 2 shows a pair of direct current motors 15 and 16 arranged to drive machines 17 and 18 respectively and provided with shunt field windings 19 and 20 which, together with the armature windings of these motors, are arranged to be supplied with current from the direct current line 3. A synchronous generator 21 mounted on the shaft of the motor 15 and arranged to have its field winding energized from the direct current line 3 is provided for supplying current to the polyphase line 13. A rotary converter 22 having its alternating current slip rings 23 connected to the polyphase line 13 and coupled to the motor 16 through an adjustable speed coupling comprising cone pulleys 24 and 25 and a belt 26 is provided for energizing the shunt field winding 27 of the motor 16 in response to changes in the speed of this motor.

Assuming the current of the shunt field winding 20 to be adjusted to a value at which the motor is accelerated to the desired operating speed, the adjustable speed connection between the motor 16 and converter 22 to be adjusted to drive the converter at its synchronous speed and the converter field to be in alinement with its commutating axis. no current will be supplied to the shunt field winding 27 from the converter 22. If the speed of the motor 16 changes, however, the converter field is moved out of alinement with the converter commutating axis and current is supplied to the shunt winding 27 as explained in connection with Fig. 1.

The arrangement of Fig. 2 has marked advantages when utilized to operate a plurality of separately driven machines which are required to be operated at speeds definitely related to one another, as in the case of paper machines for example. In this arrangement the speed of the machine 17 determines the frequency of the current supplied to the polyphase line 13 and therefore the synchronous speed of the converter 22. By adjusting the current of the shunt field winding 20 and the setting of the adjustable speed coupling between the converter 22 and the motor 16, this motor may be driven at a speed which is the same as or different from that of the motor 15 and the relation between the speeds of these motors will be maintained. The unit comprising machine 17, motor 15 and generator 21 may thus be termed the control unit, and the unit comprising machine 18, motor 16 and converter 22 may be termed the controlled unit. While I have illustrated but one controlled unit, it will be apparent that any number of controlled units may be connected between the lines 3 and 13 and that these controlled units may be operated at the same speed or at different speeds. It will also be clear that if it is desired to reduce the size of the converters, direct current exciters having their voltages controlled by the converters may be utilized to supply the current required by the regulating shunt field windings of the motors.

Fig. 3 shows an arrangement which differs from that of Fig. 1 in that an induction generator 28 is arranged to supply current of an adjustable frequency to the converter 11 and in that the motor 1 is arranged to drive a high frequency generator 29 such as is used in high frequency telegraphy. The generator 28 comprises a rotor winding 30 and a stator winding 31. The winding 31 is connected to the slip rings 12 of the converter 11 through adjustable condensers 32 and reactors 33 which may be manipulated in a well known manner to control the frequency of the current delivered by the generator 28. The synchronous speed of the converter 11 may thus be accurately adjusted to any desired value and the motor 1 will be regulated to maintain a corresponding speed. It will be apparent that current of adjustable frequency may be supplied to the converter 11 from any suitable source, such as a vacuum tube for example.

I have explained my invention by illustrating and describing certain specific embodiments thereof, but it will be readily understood by those skilled in the art that it may be embodied in many other forms than those shown and described. I accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the true spirit and scope of my invention.

What I claim as new and desire to secure by Letters Patent of the United States, is:

1. A speed control system comprising an electric motor provided with a field winding for supplying the excitation of said motor and means for regulating the excitation of said motor in accordance with its speed comprising a rotary converter arranged to be driven at a speed proportional to the speed of said motor connected to vary the motor excitation in accordance with the angular relation between the field and commutating axis of said converter.

2. A speed control system comprising a direct current motor provided with a field winding for supplying the excitation of said motor and a regulating winding for regulating the excitation of said motor in accordance with its speed, a rotary converter arranged to be driven at a speed proportional to the speed of said motor for supplying said regulating winding with a current having its value determined in accordance with the relation between the synchronous speed of said converter and the speed of said motor, and a source of alternating current for energizing said converter.

3. A speed control system comprising a direct current motor provided with a field winding for supplying the excitation of said motor and a regulating winding for regulating the excitation of said motor in accordance with its speed, a rotary converter for energizing said regulating winding in response to variations in the speed of said motor, and an adjustable speed coupling between said motor and said converter for adjusting the speed of said motor independently of the synchronous speed of said converter.

4. A system for controlling the speeds of a plurality of machines required to be operated at speeds maintained in the same relation to one another, comprising an adjustable speed motor for driving one of said machines, a motor comprising an exciting field winding and a regulating winding for driving another of said machines, a rotary converter coupled to said second mentioned motor for energizing said regulating winding in accordance with the relation between the synchronous speed of said converter and the speed of said second mentioned motor, and a synchronous generator arranged to be driven at a speed proportional to the speed of said first mentioned motor for supplying alternating current to said converter.

5. A system for controlling the speeds of a plurality of machines required to be operated at speeds maintained in the same relation to one another, comprising an adjustable speed motor for driving one of said machines, a motor comprising an exciting field winding and a regulating winding for driving another of said machines, a rotary converter arranged to be driven by said second mentioned motor through an adjustable speed coupling for energizing said regulating winding in accordance with the relation between the synchronous speed of said converter and the speed of said second mentioned motor, and a synchronous generator arranged to be driven at a speed proportional to the speed of said first mentioned motor for determining the synchronous speed of said converter.

In witness whereof, I have hereunto set my hand this 18th day of July, 1924.

LIONEL FLEISCHMANN.